Patented Jan. 3, 1939

2,142,935

UNITED STATES PATENT OFFICE 2,142,935

REDUCTION OF CHLOROTHEOPHYLLINE

Frederick Comte, Webster Groves, Mo., assignor to Monsanto Chemical Company, St. Louis, Mo., a corporation of Delaware No Drawing. Application February 20, 1937, Serial No. 126,814

3 Claims. (Cl. 260—256)

The present invention relates to a method of replacing chlorine in chlorotheophylline by hydrogen to obtain theophylline.

The principal object of the present invention is to provide a simple, inexpensive, and effective method of reducing 8-chlorotheophylline to the corresponding free base. It is a further object of the invention to provide a method whereby the yield of resulting free base is greater than has heretofore been attainable by hitherto-known methods of reduction.

For the reduction of 8-chlorotheophylline to theophylline the following methods have heretofore been suggested:

1. Reduction with hydroiodic acid, with or without phosphonium iodide (E. Fischer and Ach, Ber., 1895, 28, 3139; also United States Patent 569,489). Hydrobromic acid is now used effectively instead of hydroiodic acid.

2. Reduction by dissolving the compound in hot 20% hydrochloric acid and adding zinc dust (E. Fischer Ann., 1882, 215, 262; also United States Patent 569,489).

3. Reduction with hydrogen in the presence of alkaline colloidal platinum (Yoshitomi, (a) J. Pharm. Soc. Japan, 1924, No. 508; Chem. Abs., 1924, 18, 3174; Chem. Zentr., 1924, 2, 1593; (b) J. Pharm. Soc. Japan, 1925, No. 510 and 512; Chem. Abs., 1925, 19, 2345; Chem. Zentr., 1927, 1, 1838; (c) J. Pharm. Soc. Japan, 1926, No. 524; Chem. Abs., 1926, 20, 587).

4. Electrolytic reduction in 50% sulfuric acid solution (Yoshitomi, loc. cit.).

5. Reduction in tetrahydronaphthalene solution with less than one atomic proportion of iodine (C. F. Boehringer and Soehne; German Patent 576,604; Chem. Abs., 1933, 27, 5757).

The reduction of 8-chlorotheophylline with hydrochloric acid and zinc by the Fischer method was not quantitative, that is, the yield was low, and the product was contaminated with considerable amounts of red-colored decomposition products, which greatly complicated the refining. Electrolytic reduction in 50% sulfuric acid solution with lead electrodes produced a low yield of theophylline of inferior quality. The other known methods are excluded because of the impossibility of adapting them economically to the reduction process.

The process of the present invention is based upon the discovery that 8-chlorotheophylline is reduced easily and quantitatively by means of zinc or similar metals and water under very mild acid conditions at temperatures of about 100° C. The product is not contaminated with any substantial quantities of decomposition products or by-products and hence requires no complicated refining treatments. Furthermore, in using the process no expensive reagents are required nor is apparatus of special construction to withstand pressure or corrosion a limiting consideration.

It was quite unexpected that the mild treatment of the invention could satisfactorily be employed for the reduction of 8-chlorotheophylline, a compound which was hitherto considered particularly resistant. Powerful reducing agents and treatments were described for the particular reaction in the prior art. Furthermore, it was remarkable that the reduction proceeded easily to completion, that the yield of product was practically quantitative, and that the product itself was not contaminated with undesired by-products.

The process of the invention is exemplified in detail hereinbelow.

Into a flask provided with high-speed stirrer and a reflux condenser are added 540 grams of 8-chlorotheophylline, 1000 grams of zinc dust and 5.4 liters of water. The contents of the flask are then stirred and the stirring is continued throughout the entire treatment. Only a negligibly small quantity of the chlorotheophylline is dissolved. It is found that the pH of the liquid is 4 before the addition of zinc; after reduction starts it is between 6 and 6.5 and remains at this acidity throughout the entire reduction. The flask is then heated until the liquid is brought to a boil and heating is continued at a rate such that a gentle reflux is maintained.

To attain complete reduction approximately 16–24 hours or more are required with the above quantities. The period varies with the rate of agitation, the degree of fineness of the zinc and the chlorotheophylline crystals, the quantities being treated and the acidity being maintained.

A convenient method of observing when the compound has been completely reduced is the following, in which the crystal structures of the compounds in the reaction mixture are observed. From the mixture which is being subjected to the reduction, a small sample is removed. This sample is acidified with sulfuric acid to a pH of 4 to 4.5 and filtered hot to remove the excess zinc. A small drop of this filtered solution is then placed on a microscope slide and the excess water is allowed to evaporate. The crystals deposited on the slide are then observed under the microscope. As long as reduction is incomplete, mixed crystals of theophylline and chlorotheophylline are observed. The mixed crystals consist of single long needles with bent or deflected ends and needle agglomerates with sharp points. When chlorotheophylline is absent from the sample, that is, when reduction is complete, the characteristic crystal picture of pure theophylline, consisting of long straight prisms, mostly single, with well-defined square or beveled tips, is obtained. The differences in the crystals are very striking.

When refluxing has progressed for a sufficient time to produce complete reduction, as determined by previous experience or by the microscope as above, approximately 2000 grams of 20% sulfuric acid are slowly added to the flask. This addition of acid may require 3 hours or more. The pH of the mixture at this point should be brought to 4 or thereabouts. The acid is added to decompose the zinc salt of theophylline. At a pH of 6.3 theophylline is completely combined as zinc theophylline in the mixture and this salt is practically insoluble in the liquid. The acidified mixture is then filtered while hot to remove any excess zinc and the filtrate is allowed to cool, whereupon a heavy crystallization of snow-white theophylline occurs. A second crop of crystals can be obtained by further concentration and crystallization of the mother liquor. The theophylline is then washed free of zinc sulfate and dried. The residual quantity of theophylline can be recovered from the end mother liquor by extraction with chloroform, but since such theophylline may be contaminated with traces of unreduced chlorotheophylline, this extracted portion is returned to the next reduction batch.

8-chlorotheophylline itself is acid and may be reduced without the addition of any supplementary acid to the water during the reduction procedure. The addition of acid to the mixture during reduction facilitates the procedure but it is to be observed that the addition of any large amounts of acid during the reduction is not desirable, since it leads to the production of undesirable colored by-products, as is evidenced by following the procedure of Emil Fischer. Proportions of acid which bring the pH of the mixture to as low as two are not objectionable but, on the contrary, are desirable, especially when using reducing metals below zinc but above hydrogen in the electromotive series. If the solution should be alkaline during reduction there is a tendency to induce side-reactions and produce undesired by-products, since theophylline is unstable in the presence of alkali.

In place of zinc other metals above hydrogen in the electromotive series of metals can be used advantageously. Such metals include tin, iron, zinc, aluminum, magnesium, etc. Zinc is preferred for its cheapness, the fine degree of subdivision in which it is readily obtained commercially and its great actitvity. Activated metals, for example, amalgamated aluminum prepared by allowing aluminum particles to stand for a short time in contact with an acid solution of mercuric chloride, are especially active. On the other hand, a zinc-copper couple, prepared by allowing zinc dust to stand in contact with copper sulfate solution, has not proved to be very active in the reduction process of the present invention. Copper, which is below hydrogen in the electromotive series, evidently has a restraining effect on the zinc.

It is to be understood that the invention is not limited by any specific details or theories to explain the beneficial effects obtained by its use. The specification comprises a preferred embodiment which has been selected for purposes of illustration, therefore the invention is to be limited only by the scope of the appended claims.

What I claim is:

1. A method for the reduction of 8-chlorotheophylline to theophylline, said process comprising the treatment of the chlorinated theophylline in a slightly acid aqueous medium, the pH of which is not lower than two, with a metal above hydrogen in the electromotive series.

2. A method for the reduction of 8-chlorotheophylline to theophylline, comprising heating at approximately 100° C. a suspension of zinc metal and said chlorotheophylline in an aqueous medium which is maintained at a pH of approximately six during the reduction.

3. A method for replacing the chlorine of 8-chlorotheophylline by hydrogen, comprising heating said chlorotheophylline with zinc metal and water in the absence of free mineral acids.

FREDERICK COMTE.